US009551265B2

(12) United States Patent
Darrell (10) Patent No.: US 9,551,265 B2
(45) Date of Patent: Jan. 24, 2017

(54) CRASH ENERGY ABSORBING MUFFLER

(71) Applicant: FORD GLOBAL TECHNOLOGIES, LLC, Dearborn, MI (US)

(72) Inventor: Paul Darrell, Old Harlow (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/076,143

(22) Filed: Mar. 21, 2016

(65) Prior Publication Data

US 2016/0290208 A1    Oct. 6, 2016

(30) Foreign Application Priority Data

Apr. 2, 2015    (GB) .................................. 1505730.0

(51) Int. Cl.
*F01N 13/00* (2010.01)
*F16L 55/02* (2006.01)

(52) U.S. Cl.
CPC ............. *F01N 13/007* (2013.01); *F16L 55/02* (2013.01); *F01N 2260/00* (2013.01)

(58) Field of Classification Search
CPC ................................ F01N 13/007; F16L 55/02
USPC .................. 181/211, 212, 227, 228
See application file for complete search history.

(56) References Cited

U.S. PATENT DOCUMENTS

| | | | |
|---|---|---|---|
| 4,315,558 A * | 2/1982 | Katayama | ........... F01N 13/1816 138/120 |
| 4,540,064 A * | 9/1985 | Fujimura | .................. F01N 1/02 181/227 |
| 4,936,412 A * | 6/1990 | Sala | ........................ B60K 13/04 181/252 |
| 6,240,969 B1 * | 6/2001 | Wildermuth | ........ F01N 13/1816 138/122 |
| 6,668,972 B2 | 12/2003 | Huff et al. | |
| 7,325,652 B2 | 2/2008 | Huff et al. | |
| 7,934,580 B2 | 5/2011 | Van de Flier et al. | |
| 8,485,311 B2 * | 7/2013 | Mackenzie | ...... F02M 35/10137 123/184.21 |
| 8,672,090 B1 * | 3/2014 | Abram | .................... F01N 13/14 181/212 |
| 2016/0281559 A1 * | 9/2016 | Gommans | ............... F01N 1/003 |

FOREIGN PATENT DOCUMENTS

| | | |
|---|---|---|
| DE | 102013214612 A1 | 1/2015 |
| JP | 2013091410 A | 5/2013 |
| WO | 2006018581 A1 | 2/2006 |

OTHER PUBLICATIONS

Intellectual Property Office, Combined Search and Examination Report for corresponding Great Britain Patent Application No. GB1505730.0 dated Sep. 22, 2015.

* cited by examiner

*Primary Examiner* — Forrest M Phillips
(74) *Attorney, Agent, or Firm* — Frank A. MacKenzie; Brooks Kushman P.C.

(57) ABSTRACT

A muffler (101) for a vehicle, the muffler (101) having at least one first crumple feature (105) and at least one second crumple feature (107), the first and the second crumple features (105, 107) being configured to absorb the energy of an impact load to the muffler (101). The first crumple feature (105) is configured to deform at a first level of impact loading and the second crumple feature (107) is configured to deform at a second level of impact loading.

20 Claims, 7 Drawing Sheets

CRASH ENERGY ABSORBING MUFFLER

CROSS-REFERENCE TO RELATED APPLICATIONS

This application claims foreign priority benefits under 35 U.S.C. §119(a)-(d) to GB 1505730.0 filed Apr. 2, 2015, which is hereby incorporated by reference in its entirety.

TECHNICAL FIELD

A vehicle, for example a car or a van, may be powered by an internal combustion engine. A muffler, for example a silencer or a back box, is typically installed in an exhaust system of the engine and is designed to reduce the amount of noise emitted by the exhaust system.

BACKGROUND

The muffler has a number of chambers which are generally formed from a combination of partitions and tubes. In order to function effectively, the chambers of the muffler must be configured to dissipate the acoustic energy of the exhaust gases without affecting engine performance. The muffler must also be sturdy enough to withstand the vibrations produced by the engine and the pressures of the exhaust gasses.

The position of the muffler on the vehicle varies considerably depending on the vehicle model, but most mufflers are located underneath and towards the rear of the vehicle. As such, the overall shape of the muffler is dependent upon package restriction of the vehicle's underbody. For example, the shape of the muffler may be determined by the configuration of the vehicle's chassis and the components of the drivetrain. Furthermore, the muffler must be built to resist corrosion caused by exposure to the environment underneath the vehicle, for example exposure to water and salt.

As a result of the design requirements of the muffler, the muffler may be a relatively rigid component. With ever-increasing requirements for crash safety, it is desirable to also provide a muffler that performs well in the event of a crash.

SUMMARY

According to an aspect of the present disclosure, a muffler for a vehicle has at least one first crumple feature and at least one second crumple feature. The first crumple feature and the second crumple feature are configured to absorb the energy of an impact load to the muffler, for example during a crash. The first crumple feature is configured to deform at a first level of impact loading. The second crumple feature is configured to deform at a second level of impact loading. The first crumple feature and the second crumple feature may form at least a portion of a crumple zone of the vehicle, for example a part of the vehicle, especially the extreme front, rear and/or side of the vehicle, designed to crumple in a controlled manner during a crash and absorb most of the energy of an impact. The muffler may comprise one or more further crumple features.

The first crumple feature and the second crumple feature may be configured to deform, or begin deforming, consecutively upon application of the impact load to the muffler. The first crumple feature may define a first crash trigger, for example the first crumple feature may be configured to deform in a first manner as a result of a first type of loading. The second crumple feature may define a second crash trigger, for example the second crumple feature may be configured to deform in a second manner as a result of a second type of loading.

The first and second crumple features may each have a different stiffness. The stiffness of the first crumple feature may be different, for example lower, than the stiffness of the second crumple feature. The first crumple feature may be configured to deform at a first rate. The second crumple feature may be configured to deform at a second rate. The first rate of deformation may be faster or slower than the second rate of deformation.

The first and second crumple features may be configured to deform by different amounts. The first crumple feature may be configured to crumple by a first extent of deformation. The second crumple feature may be configured to crumple by a second extent of deformation.

The first and second crumple features may be configured to deform in different directions, for example when the muffler is in an installed configuration. The first crumple feature may be configured to deform in a first direction. The second crumple feature may be configured to deform in a second direction.

The first crumple feature and the second crumple feature may be configured to deform so that the muffler crumples in a direction substantially parallel to a transverse plane, for example a horizontal plane, of the vehicle when the muffler is in an installed configuration. For example, the muffler may be configured to crumple in a direction that is substantially parallel to or in the same plane as an impact load to the vehicle. The first crumple feature and the second crumple feature may each extend in a direction substantially perpendicular to the transverse plane of the vehicle when the muffler is in an installed configuration. The first and second crumple features may each be configured to extend across, between or through a plurality of planes of the muffler.

The muffler may comprise a single first crumple feature and a single second crumple feature. The first and second crumple features may be orientated in the same plane.

The first crumple feature and the second crumple feature may each define one or more regions of reduced stiffness of the muffler, for example a region of reduced stiffness in a wall of the muffler. The first crumple feature and the second crumple feature may each comprise one or more grooves, notches, recesses and/or openings, which may be provided in the wall. The first crumple feature and the second crumple feature may each have a different configuration, for example the first crumple feature may comprise a groove having a first depth and the second crumple feature may comprise another groove having a second depth. The groove of the first and/or second crumple feature may have a depth that varies along the length of the groove.

The first and second crumple features may be provided in one or more partitions, for example walls or baffles, of the muffler. The first crumple feature may be provided in a first wall of the muffler. The first crumple feature may be provided in a second wall of the muffler. The second crumple feature may be provided in the first wall of the muffler. The second crumple feature may be provided in the second wall of the muffler. The muffler may comprise a plurality of first walls and/or a plurality of second walls. In such an example, one of the first walls may be provided with the first crumple feature and another of the first walls may be provided with the second crumple feature. The first and second crumple features may be provided in any appropriate combination between the first and/or second walls of the muffler, such the muffler has at least the first and second crash triggers.

The first wall may be orientated perpendicular to the transverse plane of the vehicle when the muffler is in an installed configuration. The second wall may be orientated perpendicular to the transverse plane of the vehicle when the muffler is in an installed configuration. The first wall may be inclined to the transverse plane of the vehicle when the muffler is in an installed configuration. The second wall may be inclined to the transverse plane of the vehicle when the muffler is in an installed configuration.

The first wall may comprise a flange extending at least partially around the perimeter of the first wall. The second wall may comprise a flange extending at least partially around the perimeter of the second wall. The flange may comprise a rim, a collar and/or a rib configured to strengthen the wall and/or provide a means of attachment to another component of the muffler, for example the flange may be configured to allow the wall to be joined to an outer casing/shell of the muffler.

At least one first crumple feature may be provided at any appropriate part of the muffler, for example the outer shell of the muffler and/or a mounting of the muffler. At least one second crumple feature may be provided at any appropriate part of the muffler, for example the outer shell of the muffler and/or the mounting of the muffler.

The first crumple feature may comprise at least one notch provided in the flange of the first wall. The second crumple feature may comprise at least one notch provided in the flange of the first wall. The first crumple feature may comprise at least one notch provided in the flange of the second wall. The second crumple feature may comprise at least one notch provided in the flange of the second wall. At least a portion of the notch may be orientated in a plane substantially parallel to the transverse plane of the vehicle when the muffler is in an installed configuration, for example such that the notch is configured to close on itself during impact loading of the muffler, for example an impact load in a direction with at least a component parallel to the transverse plane of the vehicle. A portion of the notch may be coincident with a portion of the groove.

The first wall may be a baffle or an endplate of the muffler. The second wall may be a baffle or an end plate of the muffler.

A vehicle may be provided comprising one or more of the above-mentioned mufflers.

For a better understanding of the present disclosure, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
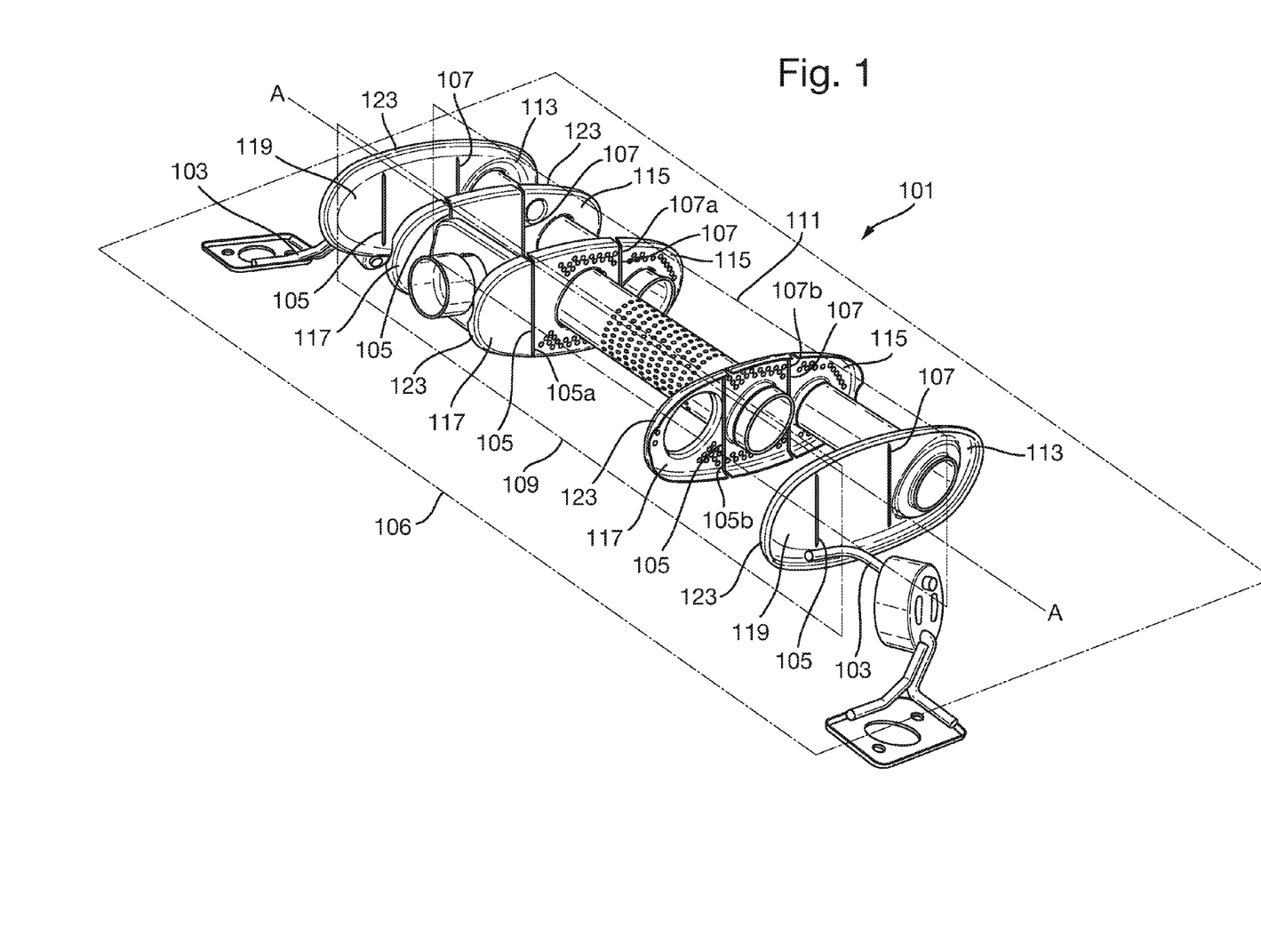
FIG. 1 is a perspective view of a muffler for vehicle (muffler outer casing not shown)

FIG. 1 shows a muffler 101 according to an example of the present disclosure. In the example shown in FIG. 1, the outer shell of the muffler 101 is not shown so that the components internal to the muffler 101 can be seen clearly. The muffler 101 shown in the example of FIG. 1 is configured to be installed on the underside of a vehicle, for example a car or a van, such that the longitudinal axis A-A of the muffler 101 is orientated substantially perpendicular to a longitudinal axis of the vehicle in an installed configuration, i.e. the longitudinal axis A-A of the muffler 101 is orientated laterally across the vehicle. The muffler 101 may be installed underneath the vehicle, for example hung using hangers 103, and may be located towards the rear of the vehicle, for example in a region of the vehicle close to a rear bumper/fender of the vehicle.

In another example, the muffler 101 may be configured to be installed on another type of vehicle, for example a truck, a marine vessel, an aircraft, or any appropriate type of vehicle. In one example, the muffler 101 may be configured to be installed on the side of the vehicle such that the longitudinal axis A-A of the muffler 101 is substantially vertical when the muffler 101 is in an installed configuration, for example when the muffler 101 is installed to the cab of truck. The longitudinal axis A-A may, however, be orientated at any appropriate angle depending on the configuration of the vehicle.

The vehicle has a transverse, e.g. horizontal, plane 106 that extends through the vehicle. For example, the transverse plane 106 of a car is parallel to the road surface during operation of the vehicle. The longitudinal axis of the muffler 101 may be orientated at any appropriate angle relative to the transverse plane 106 of the vehicle. In the example shown in FIG. 1, the longitudinal axis A-A of the muffler 101 is orientated parallel to the transverse plane 106. In another example, the longitudinal axis A-A may be inclined or perpendicular to the transverse plane 106 of the vehicle such that the muffler 101 extends away from the transverse plane 106 in at least one direction in an installed configuration.

The muffler 101 according to the present disclosure comprises at least one first crumple feature 105 and at least one second crumple feature 107. The muffler 101 may, therefore, comprise any appropriate number of first and/or second crumple features 105, 107. The muffler 101 may comprise any appropriate number of further crumple features, for example third and/or fourth crumple features, and so on.

The crumple features, for example first and second crumple features 105, 107, are each configured to absorb the energy of an impact load to the muffler 101, for example during a crash. The first and second crumple features 105, 107 form a crumple zone of the muffler. In the context of the present disclosure, a crumple zone is regarded as any part of a vehicle, for example a part of a vehicle towards the front, rear and/or side of the vehicle, that is designed to crumple easily in a crash and absorb the main force of an impact to the vehicle.

The muffler 101 shown in the example of FIG. 1 comprises a first set of first crumple features 105 each being orientated at least partially in or at least partially parallel to a first plane 109 of the muffler 101, and a second set of crumple features 107 each being orientated at least partially in or at least partially parallel to a second plane 111 of the muffler 101. For example, the first crumple feature 105a and the second crumple feature 107a are provided in the first and second planes 109, 111 respectively, while the first crumple feature 105b and the second crumple feature 107b are offset from and parallel to the first and second planes 109, 111 respectively.

In the example shown in FIG. 1, the first and second planes 109, 111 of the muffler 101 are orthogonal to the transverse plane 106 of the vehicle when the muffler 101 is in an installed configuration. In this manner, the first and second crumple features 105, 107 of the muffler 101 are oriented such that they are perpendicular to an applied force, for example an impact load, in the transverse plane 106 of the vehicle when the muffler 101 is in an installed configuration. For an example when the muffler 101 is installed parallel to the rear of a vehicle, the first and second crumple features 105, 107 of the muffler 101 are oriented such that they are parallel to the rear of the vehicle, and are thus configured to absorb the impact of a crash to the rear of the vehicle.

The first crumple feature 105 is configured to deform, i.e. begin to deform, at a first level of impact loading to the muffler and the second crumple feature 107 is configured to deform at a second level of impact loading to the muffler 101. In this manner, the present disclosure provides a muffler 101 having a plurality of crash triggers each being configured to deform at a different level of impact loading, i.e. at different points in time during a crash as the energy of the crash is absorbed and dissipated through various components of the vehicle.

In the example shown in FIG. 1, the first set of first crumple features 105 forms at least a portion of a first crash trigger, and the second set of second crumple features 107 forms at least a portion of a second crash trigger. The muffler may, however, have any appropriate number of crash triggers. The muffler 101 is configured, therefore, to collapse progressively, i.e. the collapse of the first set of first crumple features 105 occurs in or parallel to the first plane 109 at the first level of impact loading and the collapse of the second crumple features 107 occurs subsequent to the collapse of the first crumple features 105 in or parallel to the second plane 111 at the second level of impact loading. As a result of the configuration of the first and second sets of crumple features 105, 107, the muffler 101 collapses, i.e. crumples, in a predictable manner upon impact loading of the muffler 101. This is particularly advantageous, as the structure of a conventional muffler is inherently stiff due to its construction; the tubular casing (not shown) provides a longitudinal stiffness, and the plurality of walls each provide a lateral stiffness. As a result, the conventional muffler does not crumple easily and is often forced into other components of the vehicle during a crash.

The inherent stiffness of the conventional muffler may result in the force of the impact load being transferred to other components of the exhaust system. For example, an impact load to the rear of the vehicle may be transferred through the conventional muffler and along the axial length of the exhaust system to the engine of the vehicle. The muffler 101 according to the present disclosure is advantageous over the conventional muffler as the energy of the impact load may be absorbed during the crumpling of the muffler 101, which prevents the transfer of the impact load to other components of the vehicle.

The muffler 101 according to an example the present disclosure comprises a first wall 117, for example a baffle 115 of the muffler 101, and a second wall 119, for example an end plate 113 of the muffler 101. In the example shown in FIG. 1, the muffler 101 comprises two end plates 113, which are separated along the axis A-A of the muffler 101, and a plurality of baffles 115 disposed in between the end plates 113. The first and second walls 117, 119 are orientated perpendicular to axis A-A such that the walls 117, 119 are parallel to a longitudinal axis of the vehicle and perpendicular to the transverse plane 106 of the vehicle when the muffler 101 is in an installed configuration. However, the first and second walls 117, 119 may be orientated at any appropriate angle relative to the axis A-A of the muffler 101 and/or the transverse plane 106 of the vehicle when the muffler 101 is in an installed configuration.

In the example shown in FIG. 1, each of the first and second crumple features 105, 107 is configured to provide a region of reduced stiffness in the wall 117, 119, for example a reduction in the stiffness in one or more planes of the muffler 101, so that the muffler 101 may collapse around the region of reduced stiffness during a crash. The first and second crumple features 105 may each define region of reduced wall thickness in the first and second walls 117, 119, for example the thickness of the wall 117, 119 may be reduced by approximately 10-15% to provide a region of reduced stiffness in the wall 117, 119.

In the example of FIG. 1, each of the first and second crumple features 105, 107 comprises a groove (indicated by 120 in FIGS. 2A, 2B, 3, and 4) indented into the walls 117, 119 of the muffler 101. In another example, however, the first and second crumple features 105, 107 may comprise any appropriate feature that reduces the stiffness of a region of the muffler 101, for example one or more notches, recesses and/or openings, that are configured to reduce the local stiffness of a component of the muffler 101. In a further example, the first and second crumple features may comprise a collapsible element that is fabricated separately to the muffler 101 and is installed at least partially within the muffler 101 during assembly. Such a feature may alternatively be referred to as a weakening feature and/or stiffness-reducing feature and/or a stress-concentrating feature.

In the example shown in FIG. 1, the groove of each of the first and second crumple features 105, 107 extends along the face of the walls 117, 119 such that the ends of the groove are disposed towards the edge of the walls 117, 119, although in a different example, the grooves may be provided at any appropriate position on the walls 117, 119. As shown in FIG. 1, the grooves 105, 107 have lengths extending parallel with planes 109, 111 respectively, and respective widths in a direction that is substantially parallel to transverse plane 106 of the vehicle when the muffler 101 in an installed configuration such that the grooves define respective fold lines about which the walls 117, 119 deform under loading during a crash, for example an impact load from the rear of the vehicle in a direction with at least a component in the transverse plane 106 of the vehicle.

In another example (not shown), each of the crumple features 105, 107 may comprise a plurality of grooves 120 arranged to form a concertinaed portion in the wall 117, 119 of the muffler 101. The arrangement of the grooves 120 in the concertinaed portion of the wall 117, 119 may be selected such that the concertinaed portion has a desired stiffness. For example, the number of grooves 120, i.e. folds, in the concertinaed portion and/or the shape of the folds may be selected to give the desired stiffness.

The first wall 117, for example the baffle 115, comprises a flange 123 that extends at least partially around the perimeter of the first wall 117. The flange 123 may be a collar, a rim, and/or a rib provided on the first wall 117 for the purpose of strengthening and/or attaching the first wall 117 to another component of the muffler 101, for example the shell (not shown) of the muffler 101. In the example shown in FIG. 1, the second wall 119 comprises a flange 123 that extends around the perimeter of the second wall 119. One significant difference between the function of the baffle 115 and the end plate 113 is that the end plate 113 of the muffler 101 must be sealable against the shell of the muffler 101 for the purpose of sealing the exhaust gases within the muffler 101. As a result of the difference in functionality between the baffles 115 and the end plates 113, the flange 123 of the end plate 113 must extend continuously around the perimeter of the end plate 113 so that the flange 123 of the end plate 113 may be joined, for example welded, to the shell of the muffler 101, thus providing a gas-tight seal between the inside and the outside of the muffler 101. In contrast, the flange 123 of the baffle 115 need not extend continuously around the perimeter of the baffle 115, since the flange 123 of the baffle 115 is not used to seal compartments of the muffler 101.

Figure 2A:
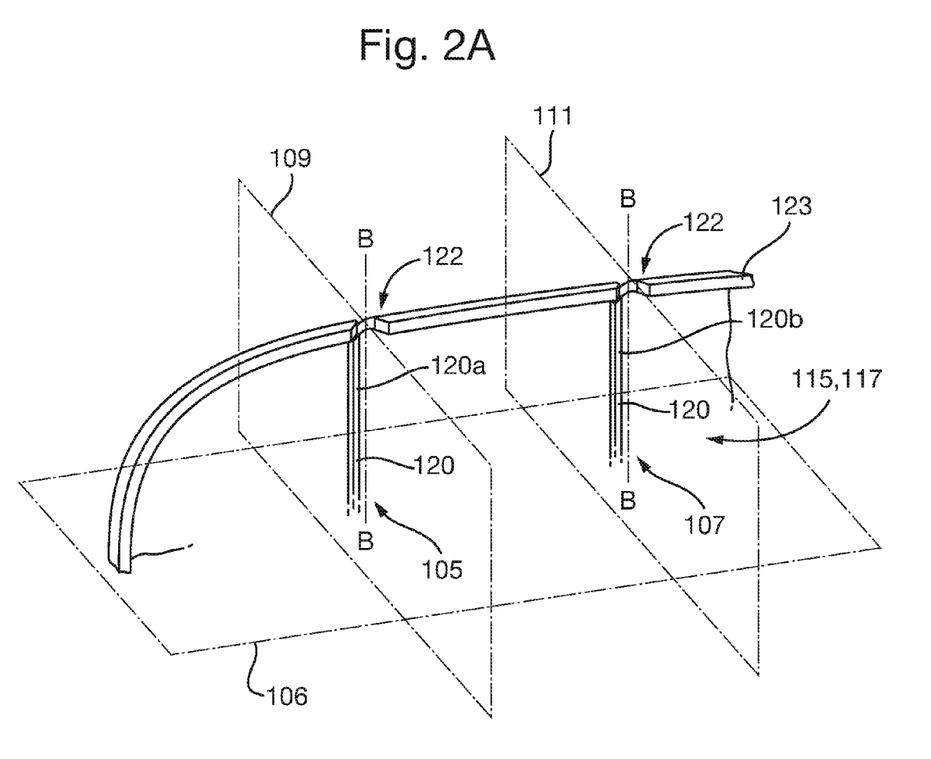
FIG. 2A is partial perspective front view of a baffle of the muffler.
Figure 2B:
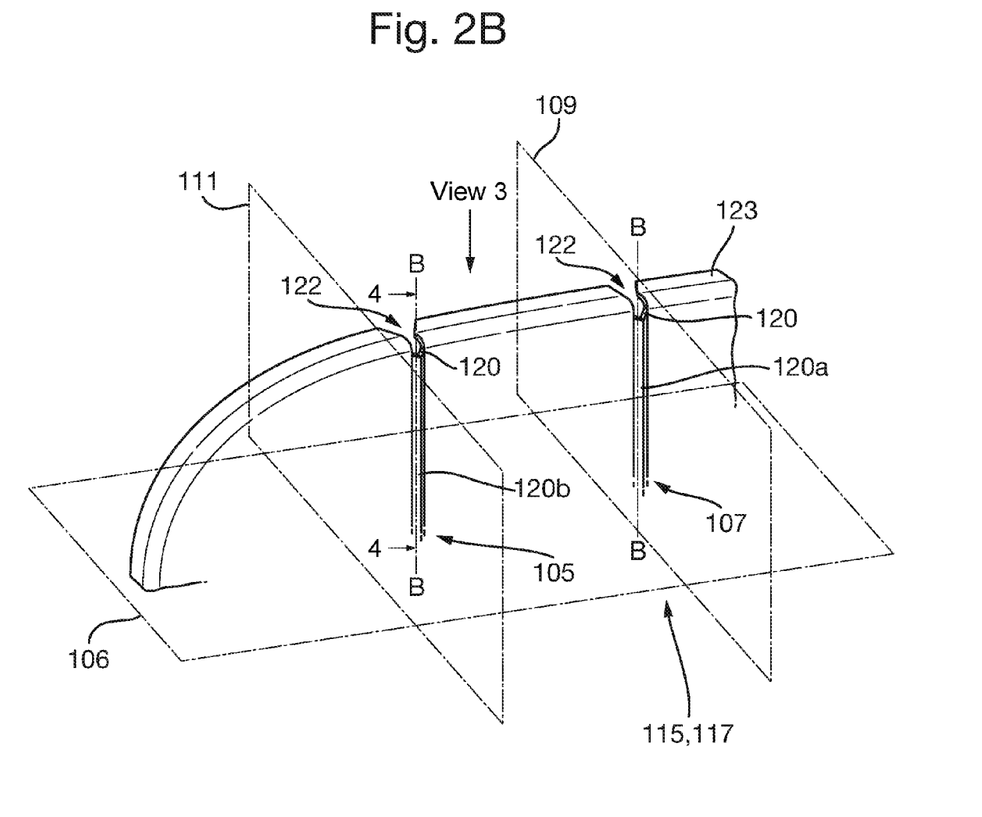
FIG. 2B is partial perspective rear view of the baffle of FIG. 2A.

In the example shown in FIGS. 1, 2A and 2B, the first and second crumple features 105, 107 of the baffle 115 each comprise notches 122 in the flange 123 of the baffle 115. The groove 120 of each of the first and second crumple features 105, 107 extends along the face of the baffle 115 such that the ends of the groove 120 are directed towards the notches 122 in the flange 123. The notches 122 intersect the grooves 120 such that the notches 122 and the grooves 120 form a continuous crumple feature 105, 107. In another example however, the notch 122 and the groove 120 may be separated or offset from each other.

Both of the grooves 120 may, as shown in FIGS. 2A, 2B, may be formed in the same face of the baffle 115.

In the example shown in FIGS. 1 to 4, the notches 122 are orientated such that the notches open, for example splay, about the longitudinal axes B-B of the grooves 120. The notches 122 are configured to provide regions of reduced stiffness [weakened regions] in the flange 123 so that flange is able to fold, for example fold easily without buckling, in a direction that is parallel to the transverse plane 106 of the vehicle, i.e. the notches 122 are able to close up on themselves during impact loading of the muffler 101.

Figure 3:
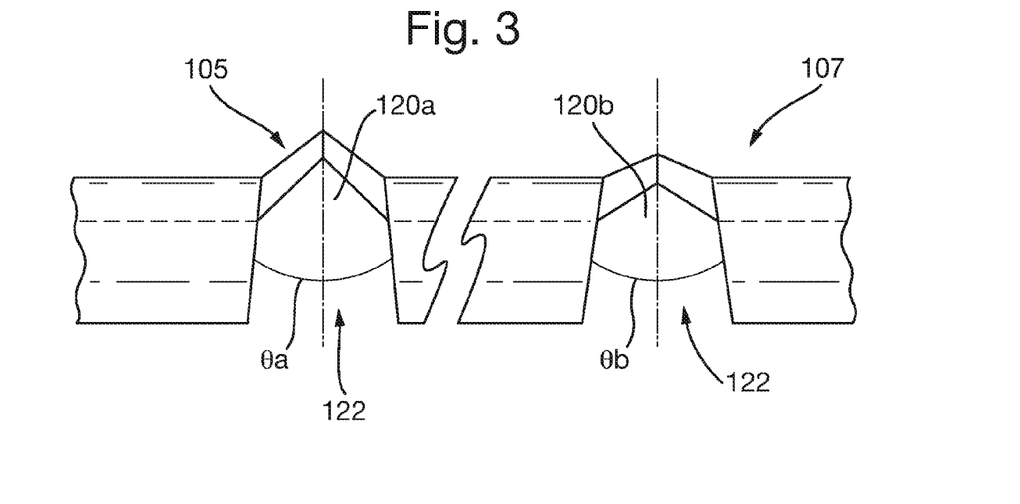
FIG. 3 is a view looking downward at the baffle of FIG. 2B, as indicated by the arrow View 3 in FIG. 2B.
Figure 4:
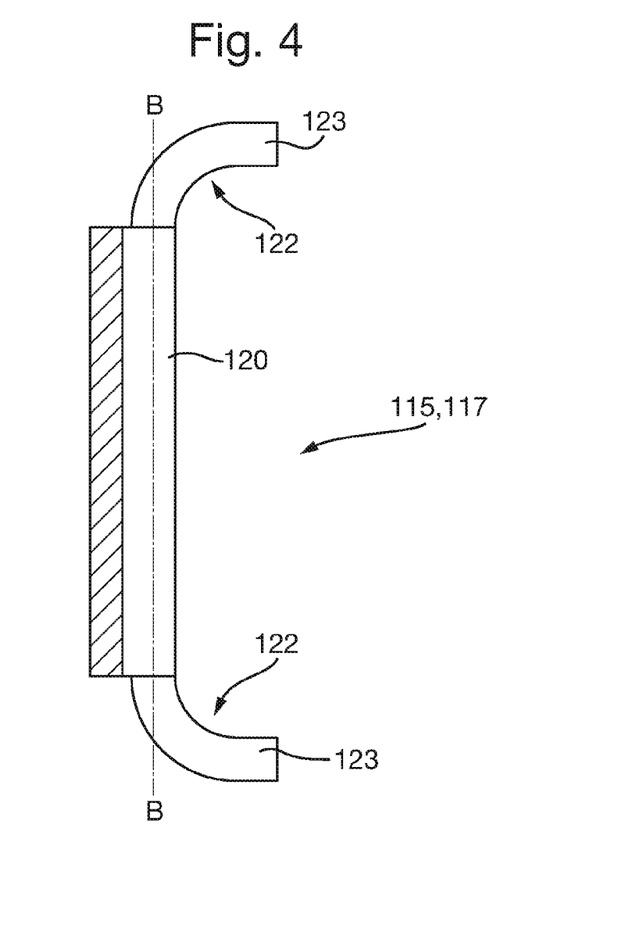
FIG. 4 is a cross-sectional view taken along line 4-4 of FIG. 2B.

FIG. 2A is a partial perspective front view of the baffle 115 of the muffler 101. FIG. 2B is a partial perspective rear view of the baffle 115 and indicates downward-looking View 3 and section 4-4. FIG. 3 is downward-looking View 3 and FIG. 4 is section 4-4. FIGS. 2A and 2B illustrate that the grooves 120 of the first and second crumple features 105, 107 extends along the face of the baffle 115 such that the ends of the groove 120 run into the base of respective notches 122. In this manner, the baffle 115 is configured to crumple in two separate regions which are each defined by the arrangement of the first and second crumple features 105, 107. For example, the groove 120 and the notches 122 provide a region of reduced stiffness about which the baffle 115 may deform upon loading of the muffler 101. In the example shown in FIGS. 1 to 4, the notches 122 extend entirely through the flange 123 and through the radius between the flange 123 and the face of the baffle 115. However, in another example, the notches 122 may only extend partially into the flange 123 of the baffle 115.

FIG. 3 illustrates how the first and second crumple features 105, 107 may be configured so that they deform at different levels of impact loading. For example, the first crumple feature 105 may comprise a groove 120a that is deeper than the groove 120b of the second crumple feature 107. As a result, the groove 120a of the first crumple feature 105 provides less resistance to the deformation of the baffle 115 than the groove 120b of the second crumple feature 107 upon loading the baffle 115.

The width of the notch 122 may be determined by a notch interior angle, which determines the width of the opening of the notch 122 in the edge of the flange 123 compared to the width of the groove 120 in the face of the baffle 115. The notch interior angle, $\theta a$, of the first crumple feature 105 may be different from the notch interior angle, $\theta b$, of the second crumple feature 107. In the example shown in FIG. 3, the notch interior angle, $\theta a$, of the first crumple feature 105 is less than the notch 122 interior angle, $\theta b$, of the second crumple feature 107. In this manner, the second crumple feature 107 is configured to deform by a greater extent than the first crumple feature 105, owing to the second crumple feature 107 being able to fold through a greater angle before the sides of the notch 122 contact each other.

Figure 5A:
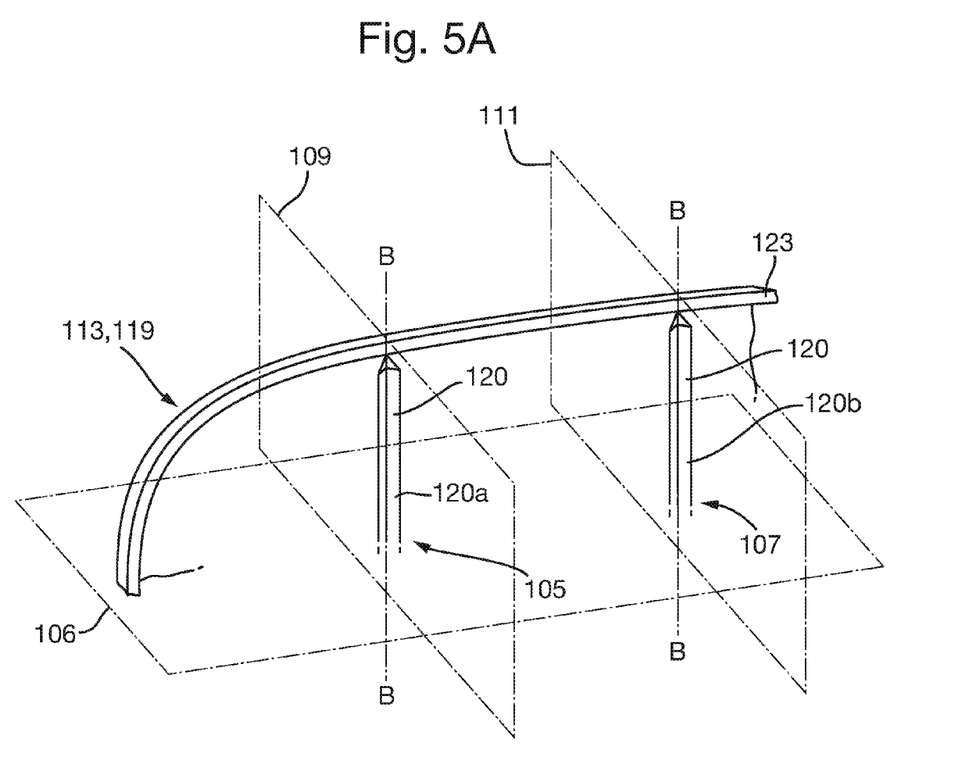
FIG. 5A is partial perspective front view of an endplate of the muffler.
Figure 5B:
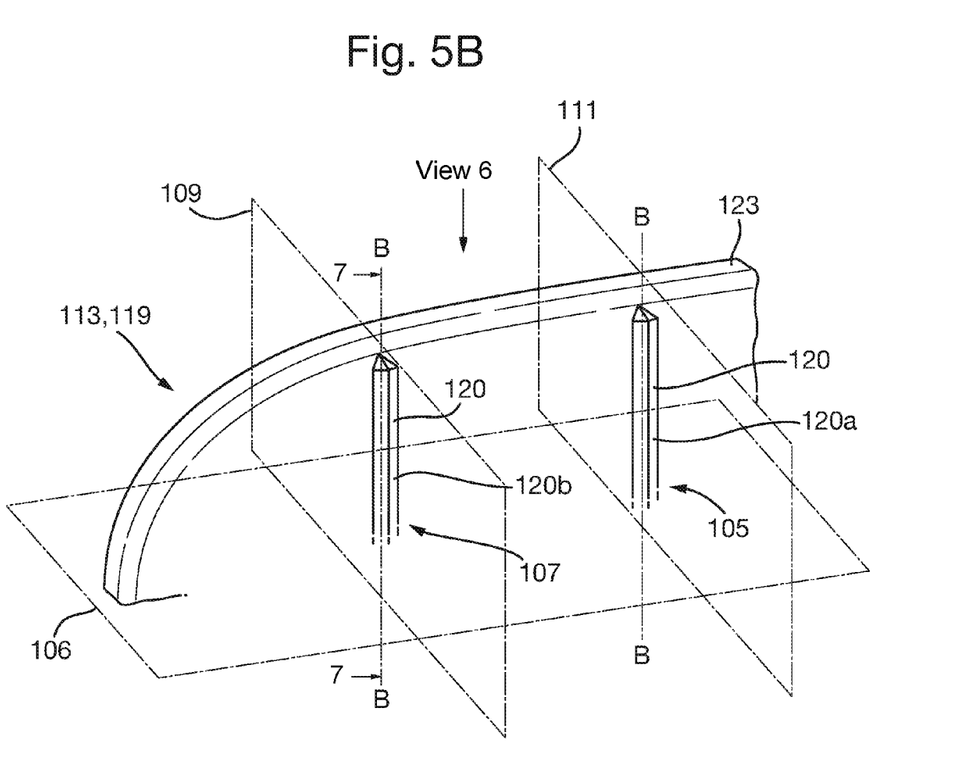
FIG. 5B is partial perspective rear view of the endplate of FIG. 5A.
Figure 6:
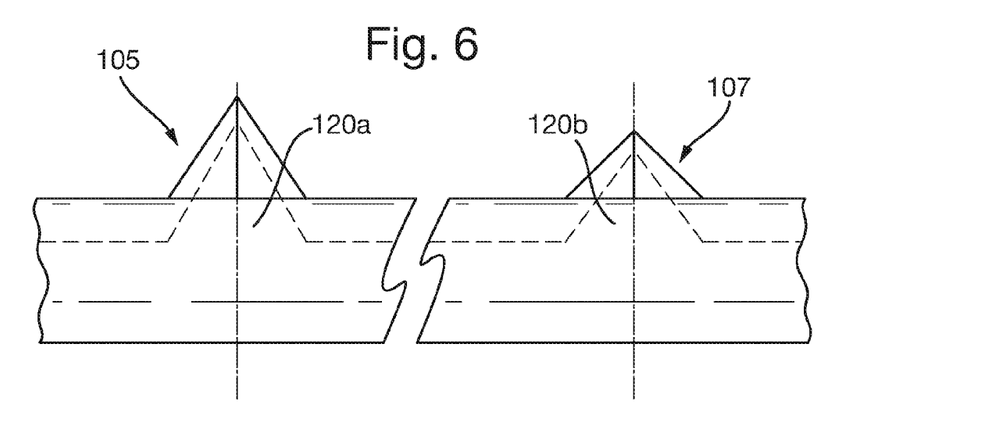
FIG. 6 is a view looking downward at the endplate of FIG. 5B, as indicated by the arrow View 6 in FIG. 5B.
Figure 7:
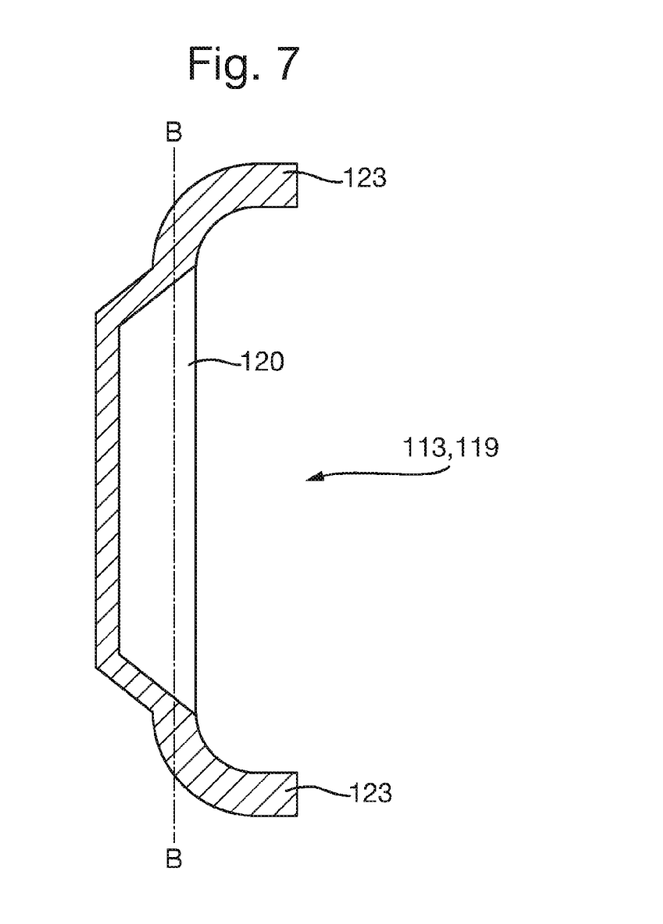
FIG. 7 is a cross-sectional view taken along line 7-7 of FIG. 5B.

FIG. 5A is a partial perspective front view of the end plate 113 of the muffler 101. FIG. 5B is a partial perspective rear view of the end plate 113 of the muffler 101. FIG. 5B indicates view C and section DD as shown in FIGS. 6 and 7 respectively.

As mentioned in the above description, the purpose of the flange 123 of the end plate 113 is to provide a continuous feature around the perimeter of the end plate 113 to which the skin of the muffler 101 may be joined, for example welded, thereby forming a seal between the inside and the outside of the muffler 101. In this regard, in the example shown in FIGS. 1 and 5A to 7, the flange 123 of the end plate 113 does not comprise a notch 122. However in an alternative example, the flange 123 of the end plate 113 may comprise at least one notch 122. For example the flange 123 of the end plate 111 may be provided with a notch 122 that does not extend through the full depth of the flange 123. In this manner, the flange may still provide a continuous surface around the perimeter of the end plate 113 to which the skin of the muffler 101 may be joined to form a seal between the inside and the outside of the muffler 101.

In the example shown in FIG. 1, the first crumple feature 105 in the baffle 115 is configured differently to the first crumple feature 105 in the end plate 113 as a result of the functional requirements of the flange 123 of the end plate 113. However, it is understood that despite the difference in configuration, the first crumple feature 105 in the baffle 115 and the first crumple feature 105 in the end plate 113 may still have substantially similar stiffness characteristics. For example, the groove 120 of the first crumple feature 105 in the end plate 113 may be deeper than the groove 120 of the first crumple feature 105 in the baffle 115 to account for the lack of notches 122 in the flange 123 of the endplate 113.

In a similar manner to the baffles 115, the end plates 113 comprise first and second crumple features 105, 107 that are configured to deform at different levels of impact loading. In the example shown in FIG. 6, the first crumple feature 105 comprises a groove 120a that is deeper than the groove 120b of the second crumple feature 107. The first crumple feature 105 is configured, therefore, to deform at a lower level of impact loading than the second crumple feature 107. However, in an alternative example, the second crumple feature 107 may be configured to deform at a lower level of impact loading than the first crumple feature 105.

In one example, the first crumple feature 105 and the second crumple feature 107 may be configured to deform consecutively upon application of the impact load to the muffler 101. For example, the first crumple feature 105 may be configured to deform to the full extent of its permitted deformation before the second crumple feature 107 starts to deform. In another example, the second crumple feature 107 may be configured such that the deformation of the second crumple feature 107 is initiated prior to the first crumple feature 105 reaching the full extent of its deformation. The extent of the deformation of the first and second crumple features 105, 107 may be determined by the depth of the groove 120, the width of the groove 120, the thickness of the baffle material which forms the groove 120 in the face of the baffle 115, the length of the groove 120, and/or the notch interior angle $\theta a$, $\theta b$. In this manner, the characteristics of each of the first crumple feature 105 and the second crumple feature 107 may be selected such that each of the first and second crumple features 105, 107 deform in the desired manner that is appropriate for the application and orientation of the muffler 101. For example, the characteristics of each of the first crumple feature 105 and the second crumple feature 107 may be selected such that they start to deform at the desired level of impact loading, deform by the desired amount, deform at the desired rate and/or deform in the desired direction.

For an example of a conventional muffler, the baffles 115 and end plates 113 are seen as stiffness-increasing members as they do not comprise crumple features 105, 107. As a result, a conventional muffler acts as a rigid body during a crash in both longitudinal and lateral directions. For example, the baffles 115 within the conventional muffler (one having no engineered stiffness-reducing or weakening features) serve to stiffen the tubular structure of the muffler such that the muffler does not crumple upon impact loading. During a crash, therefore, a conventional muffler may rotate on its mounting points which may cause the muffler to damage other components of the vehicle, for example the chassis, subframe, and/or drivetrain components. The muffler 101 according to the present disclosure is advantageous as each of the first and second crumple features 105, 107 may be manufactured by simple pressing and/or machining processes. In this manner, the present disclosure provides a way of tuning the crash performance of the muffler 101 by modification to existing designs of baffles and end plates 115, 117.

It will be appreciated by those skilled in the art that although the disclosure has been described by way of example with reference to one or more examples, it is not limited to the disclosed examples and that alternative examples could be constructed without departing from the scope of the disclosure as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle muffler comprising:
   an internal wall having a flange around at least a portion thereof;
   a first groove indented into the wall;
   a first notch formed in the flange adjacent an end of the first groove, the first notch and first groove configured to promote deformation of the wall at the first groove when subjected to a first loading level;
   a second groove indented into the wall; and
   a second notch formed in the flange at an end of the second groove, the second notch and second groove configured to promote deformation of the wall at the second groove when subjected to a second loading level greater than the first level.

2. The muffler of claim 1, further comprising a third notch formed in the flange at a second end of the first groove and a fourth notch formed in the flange at a second end of the second groove.

3. The muffler of claim 1, wherein the first and second grooves are formed in a first face of the wall.

4. The muffler of claim 1, wherein the first and second grooves are parallel with one another.

5. The muffler of claim 1, wherein a one of the notches has a first interior angle allowing a first designed extent of deformation of the wall, and an other of the notches has a second interior angle greater than the first interior angle allowing a second designed extent of deformation of the wall greater than the first designed extent of deformation.

6. A vehicle muffler comprising:
   an internal wall having a first weakening feature formed therein having a configuration designed to promote deformation of the wall at the first weakening feature at a first loading level, and a second weakening feature formed therein having a configuration designed to promote deformation of the wall at the second weakening feature at a second loading level greater than the first level.

7. The muffler of claim 6, wherein each of the first and the second weakening feature is configured to promote deformation of the muffler in a direction substantially parallel to a transverse plane of the vehicle when the muffler is in an installed configuration in a vehicle.

8. The muffler of claim 6, wherein the wall is orientated such that, when the muffler is in an installed configuration in a vehicle, the wall is perpendicular to a transverse plane of the vehicle.

9. The muffler of claim 6, wherein the first and second weakening features comprise respective first and second linear grooves indented into the wall.

10. The muffler of claim 9, wherein the first and second grooves are parallel with one another.

11. The muffler of claim 6, wherein the wall further comprises a flange around at least a portion thereof, the first weakening feature comprises a first notch in the flange, and the second weakening feature comprises a second notch in the flange.

12. The muffler of claim 11, wherein a one of the notches has a first interior angle to allow a first designed extent of deformation of the wall, and an other of the notches has a second interior angle greater than the first interior angle to allow a second designed extent of deformation of the wall greater than the first designed extent of deformation.

13. The muffler of claim 11, wherein the flange is oriented such that, when the muffler is in an installed configuration in a vehicle, a portion of flange at which the notch is located is orientated in a plane substantially parallel to a transverse plane of the vehicle.

14. A vehicle muffler comprising:
an internal wall having a first groove indented therein with a configuration designed to deform at a first loading level, and a second groove indented therein and has a configuration designed to deform at a second loading level greater than the first loading level.

15. The muffler of claim 14, wherein the first groove is deeper than the second groove.

16. The muffler of claim 14, wherein the first groove and the second groove are formed in a first face of the wall.

17. The muffler of claim 14, wherein the first groove and the second groove are parallel with one another.

18. The muffler of claim 14, wherein the wall is orientated such that, when the muffler is in an installed configuration in a vehicle, the wall is perpendicular to a transverse plane of the vehicle.

19. The muffler of claim 14, wherein the wall comprises a flange around at least a portion thereof, a first notch is formed in the flange adjacent an end of the first groove, and a second notch is formed in the flange adjacent an end of the second groove.

20. The muffler of claim 19, wherein the flange is oriented such that, when the muffler is in an installed configuration in a vehicle, a portion of flange at which the notch is located is orientated in a plane substantially parallel to a transverse plane of the vehicle.

* * * * *